United States Patent
Dai et al.

(10) Patent No.: US 11,328,878 B2
(45) Date of Patent: May 10, 2022

(54) MICROPOROUS AND HIERARCHICAL POROUS CARBON

(71) Applicant: GM GLOBAL TECHNOLOGY OPERATIONS LLC, Detroit, MI (US)

(72) Inventors: Fang Dai, Troy, MI (US); Jingmei Shen, Sterling Heights, MI (US); Mei Cai, Bloomfield Hills, MI (US); Anne M. Dailly, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 16/453,112

(22) Filed: Jun. 26, 2019

(65) Prior Publication Data
US 2019/0326070 A1     Oct. 24, 2019

Related U.S. Application Data

(63) Continuation of application No. 15/473,052, filed on Mar. 29, 2017, now Pat. No. 10,381,170.

(51) Int. Cl.
| | |
|---|---|
| C01B 31/08 | (2006.01) |
| H01G 11/62 | (2013.01) |
| H01G 11/24 | (2013.01) |
| H01G 11/34 | (2013.01) |
| H01M 4/62 | (2006.01) |
| C01B 32/342 | (2017.01) |
| H01G 11/86 | (2013.01) |
| C01B 32/30 | (2017.01) |
| H01G 11/60 | (2013.01) |
| H01M 10/052 | (2010.01) |

(52) U.S. Cl.
CPC ............. *H01G 11/62* (2013.01); *C01B 32/30* (2017.08); *C01B 32/342* (2017.08); *H01G 11/24* (2013.01); *H01G 11/34* (2013.01); *H01G 11/60* (2013.01); *H01G 11/86* (2013.01); *H01M 4/625* (2013.01); *C01P 2004/61* (2013.01); *C01P 2006/14* (2013.01); *C01P 2006/16* (2013.01); *C01P 2006/40* (2013.01); *H01M 10/052* (2013.01)

(58) Field of Classification Search
CPC ............................ C01B 32/30; C01P 2006/14
See application file for complete search history.

(56) References Cited

U.S. PATENT DOCUMENTS

| | | | | |
|---|---|---|---|---|
| 5,993,697 | A |  | 11/1999 | Cohen et al. |
| 7,927,693 | B2 | * | 4/2011 | Tsao ..................... B82Y 30/00 |
| | | | | 428/305.5 |
| 8,501,142 | B2 | * | 8/2013 | Tennison ................ F27B 7/162 |
| | | | | 423/445 R |
| 10,011,487 | B2 | * | 7/2018 | Mihara .................... C01B 32/05 |
| 10,270,082 | B2 | * | 4/2019 | Horiguchi .............. H01G 11/00 |
| 10,593,958 | B2 | * | 3/2020 | Zhi ........................ H01M 4/8878 |

FOREIGN PATENT DOCUMENTS

CN        101585527 A        11/2009

OTHER PUBLICATIONS

Tang, Duihai; Hu, Shi; Dai, Fang; Yi, Ran; Gordin, Mikahil L.; Chen, Shuru; Song, Jiangxuan; Wang, Donghai; "Self-Templated Synthesis of Mesoporous Carbon from Carbon Tetrachloride Precursor for Supercapacitor Electrodes"; Applied Materials & Interfaces; Feb. 25, 2016; pp. 6779-6783; Periodic XIII.

* cited by examiner

*Primary Examiner* — Stuart L Hendrickson
(74) *Attorney, Agent, or Firm* — Harness, Dickey & Pierce, P.L.C.

(57) ABSTRACT

A porous carbon material includes a hierarchical porous structure including a primary microporous structure and at least one of a secondary mesoporous structure and a secondary macroporous structure. The porous carbon material is formed by combining a halogenated-hydrocarbon, an aprotic hydrocarbon solvent, and a reductant to initiate a reaction that forms intermediate particles having a microporous framework; and subjecting the intermediate particles to a heat treatment at a heat treatment temperature ranging from about 300° C. to less than 1,500° C. for a heat treatment time period ranging from about 20 minutes to about 10 hours to thereby form the porous carbon material. The aprotic hydrocarbon solvent is selected from the group consisting of toluene, hexane, cyclohexane, and combinations thereof.

19 Claims, 6 Drawing Sheets

MICROPOROUS AND HIERARCHICAL POROUS CARBON

CROSS-REFERENCE TO RELATED APPLICATIONS

This application is a continuation of U.S. patent application Ser. No. 15/473,052, filed on Mar. 29, 2017, which is hereby incorporated by reference in its entirety.

INTRODUCTION

Advanced energy storage systems are in demand to satisfy requirements of fast-growing electrical vehicle (EV) applications. Among a variety of electrochemical energy storage systems, supercapacitors and lithium-ion batteries are currently recognized as two promising systems. Supercapacitors are often used in power-based applications, as they deliver a high power density (as high as 10 kW/kg) with a low energy density (less than 10 Wh/kg). In contrast, lithium-ion batteries are often used as energy-based systems, as they can deliver high energy densities (100-200 Wh/kg).

SUMMARY

A porous carbon material includes a hierarchical porous structure including a primary microporous structure and at least one of a secondary mesoporous structure and a secondary macroporous structure. The porous carbon material is formed by combining a halogenated-hydrocarbon, an aprotic hydrocarbon solvent, and a reductant to initiate a reaction that forms intermediate particles having a microporous framework; and subjecting the intermediate particles to a heat treatment at a heat treatment temperature ranging from about 300° C. to less than 1,500° C. for a heat treatment time period ranging from about 20 minutes to about 10 hours to thereby form the porous carbon material. The aprotic hydrocarbon solvent is selected from the group consisting of toluene, hexane, cyclohexane, and combinations thereof.

In one aspect, the primary microporous structure may include a plurality of micropores having a pore size of less than 2 nm and the secondary mesoporous structure may include a plurality of mesopores having a meso pore size of from 2 nm to 50 nm.

In another aspect, the primary microporous structure may include a plurality of micropores having a pore size of less than 2 nm and the secondary macroporous structure may include a plurality of macropores having a macro pore size of greater than 50 nm.

In a further aspect, the primary microporous structure may include a plurality of micropores having a pore size of less than 2 nm, the secondary mesoporous structure may include a plurality of mesopores having a meso pores size of from 2 nm to 50 nm, and the secondary macroporous structure may include a plurality of macropores having a macro pore size of greater than 50 nm.

In an additional aspect, the plurality of mesopores may be randomly spaced among the porous carbon material.

In yet another aspect, the plurality of macropores may be randomly spaced among the porous carbon material.

In yet a further aspect, the plurality of mesopores and the plurality of macropores may be randomly spaced within the porous carbon material.

In yet an additional aspect, at least some of plurality of micropores may be interconnected with one another.

In one aspect, at least some of the plurality of micropores may be interconnected with at least some of the plurality of mesopores.

In another aspect, at least some of the plurality of micropores may be interconnected with at least some of the plurality of macropores.

In a further aspect, at least some of the plurality of micropores may be interconnected with at least one of at least some of the plurality of mesopores and at least some of the plurality of macropores.

In an additional aspect, the porous carbon material may have a surface area that is less than 2,500 $m^2/g$ as measured by the Brunauer, Emmett, and Teller (BET) test method.

In yet another aspect, the porous carbon material may have a bulk particle size of from 1 μm to 500 μm.

In yet a further aspect, the porous carbon material may be nitrogen-doped and configured as an electrocatalyst for oxygen reduction.

In yet an additional aspect, an electrode may include the porous carbon material, a polymer binder, and a conductive filler.

In one aspect, the electrode may further include a composite that includes the porous carbon material and one of sulfur and selenium.

In another aspect, an energy storage device may include the porous carbon material.

In a further aspect, the energy storage device may be one of an electric double-layer capacitor and an asymmetrical supercapacitor.

In an additional aspect, the energy storage device may be one of a lithium-sulfur battery and a lithium-selenium battery.

In yet another aspect, the energy storage device may be a gas storage system and the porous carbon material may be configured to adsorb at least one of methane, natural gas, carbon dioxide, butane, and hydrogen.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein form porous carbon materials. In each of the examples, starting materials are selected that undergo a reaction that enables micropores to form via a self-templating process (i.e., where the reaction generates a byproduct which acts as the pore template). In other examples, the micropores are formed via the self-templating process, and an external template is added to the starting materials to enable the formation of mesopores and/or macropores. As such, the examples disclosed herein provide the ability to control the porous structure that is formed within the carbon material.

In an example, the method comprises combining a halogenide-hydrocarbon, an aprotic hydrocarbon solvent, and a reductant to initiate a reaction that forms intermediate particles having a microporous framework; and subjecting the intermediate particles to a heat treatment at a heat treatment temperature ranging from about 300° C. to less than 1500° C. for a heat treatment time period ranging from about 20 minutes to about 10 hours to form a precursor to microporous carbon. As used herein, the term "intermediate particles" refers to small materials having a microporous framework, where the walls of the framework are made up of carbon, hydrocarbon, or a combination thereof, and where micropores are formed among the walls, but the micropores are temporarily filled with a byproduct from the reaction used to form the small materials. In some instances, mesopores and/or macropores may also be formed among the microporous framework. The mesopores and/or macropores of these examples of the intermediate particles temporarily contain a template. Also as used herein, the term "precursor to microporous carbon" refers to intermediate particles that have been exposed to the heat treatment, and thus have walls made up of carbon. The micropores of the precursor also temporarily contain the byproduct. Mesopores and/or macropores of some examples of the precursor also temporarily contain the template.

Figure 1A:
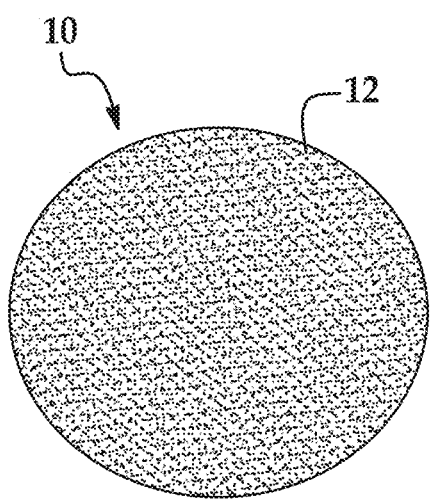
FIGS. 1A through 1D are schematic illustrations of examples of the microporous carbon (1A), and examples of carbon particles with the hierarchical porous structure (1B-1D)
Figure 1B:
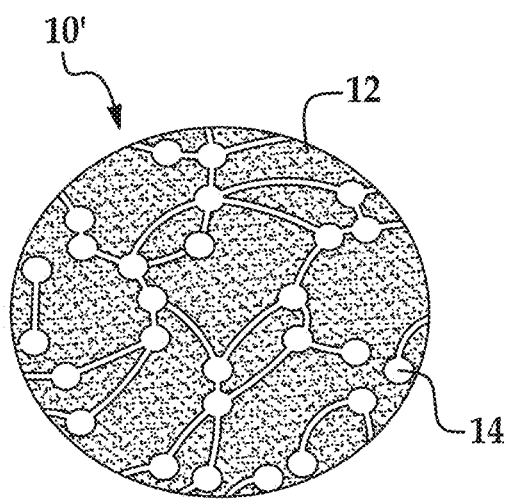
Figure 1C:
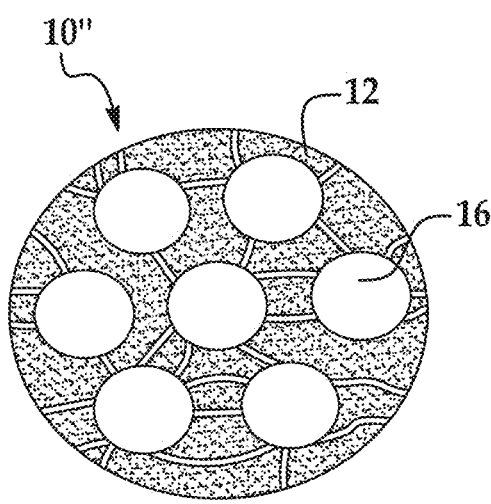
Figure 1D:
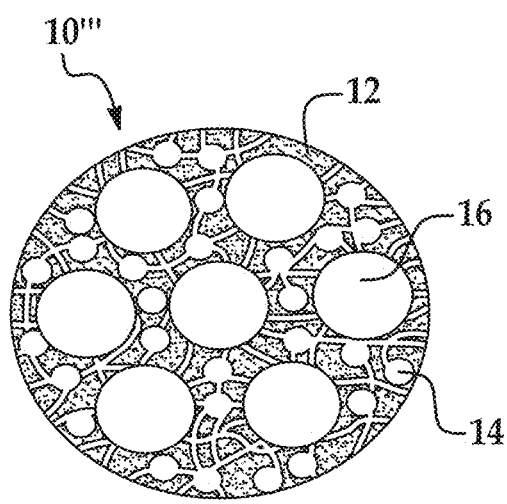

Some examples of the method disclosed herein may be used to form microporous carbon 10 (e.g., carbon having micropores 12 with a pore size less than (<) 2 nm) (an example of which is shown in FIG. 1A). Other examples of the method disclosed herein may be used to form porous carbon particles with a hierarchical porous structure (see FIGS. 1B-1D). As used herein, the term "hierarchical porous structure" refers to at least two different pore sizes distributed throughout carbon walls of the framework. In some of these examples, the porous carbon particles 10' have a primary microporous structure (e.g., pores 12 with a pore size less than 2 nm are formed in and/or between carbon walls of the structure/framework) and a secondary mesoporous structure (e.g., mesopores 14 with a pore size ranging from 2 nm to 50 nm are formed among the carbon, microporous structure/framework) (an example of which is shown in FIG. 1B). In others of these examples, the carbon particles 10" have the primary microporous structure and a secondary macroporous structure (e.g., macropores 16 with a pore size greater than 50 nm are formed among the carbon, microporous structure/framework) (an example of which is shown in FIG. 1C). In still others of these examples, the carbon particles 10''' have the primary microporous structure (e.g., pores 12) and both the secondary mesoporous structure (e.g., mesopores 14) and the secondary macroporous structure (e.g., macropores 16) (an example of which is shown in FIG. 1D). In any of these examples, the mesopores 14 and/or the macropores 16 may be randomly spaced among the microporous carbon. In any of the examples disclosed herein, at least some of the micropores 12 may be interconnected to each other, and/or to the mesopores 14 and/or the macropores 16, when either or both of the latter are present.

The microporous carbon (i.e., having only micropores) or the porous carbon particles with the hierarchical porous structure (i.e., having micropores along with mesopores and/or macropores) may have a BET (Brunauer, Emmett and Teller) surface area that is less than 2500 m$^2$/g.

Examples of the method disclosed herein include combining a halogenide-hydrocarbon, an aprotic hydrocarbon solvent, and a reductant. In some examples, no other components are combined with the halogenide-hydrocarbon, the aprotic hydrocarbon solvent, and the reductant. In these examples, the combination consists of the halogenide-hydrocarbon, the aprotic hydrocarbon solvent, and the reductant. As such, in these and other examples, a template is not combined with the halogenide-hydrocarbon, the aprotic hydrocarbon solvent, and the reductant. In these examples, the combination and/or the method may exclude the template, and also exclude additional processes to remove the template. In still some other examples, additional component(s) may be combined with the halogenide-hydrocarbon, the aprotic hydrocarbon solvent, and the reductant. An example of an additional component is the template. In still further examples, the microporous carbon particles (i.e., having only micropores) or the porous carbon particles with the hierarchical porous structure may be nitrogen-doped. Examples of doping are described hereinbelow.

It is to be understood that combining the halogenide-hydrocarbon, the aprotic hydrocarbon solvent, and the reductant may be accomplished by introducing the halogenide-hydrocarbon, the aprotic hydrocarbon solvent, and the reductant in any order, as long as the aprotic hydrocarbon solvent is not added last. The halogenide-hydrocarbon and the reductant react to form the intermediate particles, and the aprotic hydrocarbon solvent is the medium in which the reaction occurs. As the reaction mediator, it may be desirable for the aprotic hydrocarbon solvent to be present when the halogenide-hydrocarbon and the reductant are added together. For example, the halogenide-hydrocarbon and the aprotic hydrocarbon solvent may be combined first, and then the reductant may be added. For another example, the halogenide-hydrocarbon, the aprotic hydrocarbon solvent, and the reductant may all be combined at once. For still another example, the reductant and the aprotic hydrocarbon solvent may be combined first, and then the halogenide-hydrocarbon may be added.

The halogenide-hydrocarbon (i.e., halogenated hydrocarbon) is the precursor to the porous carbon. The halogenide-hydrocarbon may be any compound that includes both a hydrocarbon (e.g., alkane, alkene, alkyne, etc.) and a halogen (e.g., F, Cl, Br, etc.). In some examples, the halogenide-hydrocarbon may be a single-number carbon precursor, such as of dichloromethane, trichloromethane (i.e., chloroform), tetrachloromethane, tribromomethane (i.e., bromoform), etc. In other examples, the halogenide-hydrocarbon may be a multi-number carbon precursor, such as vinyl chloride, 1-chlorobutane, etc. In an example, the halogenide-hydrocarbon is selected from the group consisting of dichloromethane, trichloromethane, tetrachloromethane, tribromomethane, vinyl chloride, 1-chlorobutane, and combinations thereof.

As mentioned above, when the microporous carbon or the porous carbon particles with the hierarchical porous structure are to be nitrogen-doped, the halogenide-hydrocarbon may be a nitrogen-containing halogenide-hydrocarbon. Examples of the nitrogen-containing halogenide-hydrocarbon include tetrahexylammonium chloride, tetrapentylammonium bromide, and combinations thereof. Moreover, any of the halogenide-hydrocarbons may be used in combination with any of the nitrogen-containing halogenide-hydrocarbons to produce nitrogen-doped microporous carbon or nitrogen-doped porous carbon particles with the hierarchical porous structure.

The halogenide-hydrocarbon (i.e., the halogenide-hydrocarbon, the nitrogen-containing halogenide-hydrocarbon, or combinations thereof) may be present in the combination in an amount ranging from about 1 wt % to about 99 wt % (based on the total wt % of the combination).

The combination further includes the aprotic hydrocarbon solvent. The aprotic hydrocarbon solvent may be any aprotic hydrocarbon solvent that acts as a reaction mediator for the chemical reaction that forms the intermediate particles and that does not precipitate as a result of the chemical reaction. The aprotic hydrocarbon solvent is the chemical agent in which the reaction that forms the intermediate particles occurs. As the reaction mediator, the aprotic hydrocarbon solvent may slow the reaction rate of the reaction between the halogenide-hydrocarbon and the reductant, and absorb some of the heat of the highly exothermic reaction. If the aprotic hydrocarbon solvent is not used, the heat of the reaction may result in undesirable effects. In some examples, the aprotic hydrocarbon solvent is selected from the group consisting of toluene, hexane, cyclohexane, and combinations thereof.

The aprotic hydrocarbon solvent may be used in any suitable amount that will counteract the heat of the exothermic reaction. As examples, the aprotic hydrocarbon solvent may be present in the combination in an amount ranging from about 10 wt % to about 99 wt % (based on the total wt % of the combination).

The combination further includes the reductant. The reductant may be any reducing agent that can react with and reduce the halogenide-hydrocarbon to form the intermediate particles. In some examples, the reductant may be an alkaline metal or an alloy thereof, such as lithium metal, a lithium metal alloy, sodium metal, a sodium metal alloy, potassium metal, a potassium metal alloy, rubidium metal, a rubidium metal alloy, caesium (i.e., cesium) metal, a caesium metal alloy, francium metal, or a francium metal alloy. In other examples, the reductant may be an alkaline earth metal or an alloy thereof, such as beryllium metal, a beryllium metal alloy, magnesium metal, a magnesium metal alloy, calcium metal, a calcium metal alloy, strontium metal, a strontium metal alloy, barium metal, a barium metal alloy, radium metal, or a radium metal alloy. In an example, the reductant is selected from the group consisting of lithium metal, a lithium metal alloy, sodium metal, a sodium metal alloy, potassium metal, a potassium metal alloy, rubidium metal, a rubidium metal alloy, caesium metal, a caesium metal alloy, francium metal, a francium metal alloy, beryllium metal, a beryllium metal alloy, magnesium metal, a magnesium metal alloy, calcium metal, a calcium metal alloy, strontium metal, a strontium metal alloy, barium metal, a barium metal alloy, radium metal, a radium metal alloy, and combinations thereof. In another example, the reductant is selected from the group consisting of sodium metal, a sodium metal alloy, potassium metal, a potassium metal alloy, magnesium metal, a magnesium metal alloy, and combinations thereof.

The reductant may be present in the combination in an amount ranging from about 1 wt % to about 99 wt % (based on the total wt % of the combination). It is to be understood that the amount of the reductant depends upon the amount of the halogenide-hydrocarbon. For a complete reaction to occur, the mole ratio of the halogenide-hydrocarbon to the reductant should be 1:1, although it is contemplated that an excess of the halogenide-hydrocarbon or an excess of the reductant may be used. For example, the mole ratio of the halogenide-hydrocarbon to the reductant may range from 1:10 to 10:1.

Combining the halogenide-hydrocarbon, the aprotic hydrocarbon solvent, and the reductant initiates a reaction that forms the intermediate particles. More particularly, the halogenide-hydrocarbon reacts with the reductant and reduces to form carbon and/or hydrocarbon(s), and associated byproduct(s). The byproducts(s) are formed among the walls of the carbon and/or hydrocarbon, and occupy spaces that will ultimately form at least some of the micropores. As such, after the reaction, a majority of the formed micropores are initially filled with the byproduct(s). As an example, when the reductant is an alkaline metal, an alkaline metal alloy, an alkaline earth metal, or an alkaline earth metal alloy, the halogenide-hydrocarbon and the reductant react to form the carbon and/or hydrocarbon walls of the framework and a simple metal salt (i.e., the byproduct), which may be present in and/or between the carbon and/or hydrocarbon walls. The simple metal salt may be formed from the alkaline metal, the alkaline metal alloy, the alkaline earth metal, or the alkaline earth metal alloy (as the cation) and the halogen (as the anion). Since the metal salt byproduct occupies at least some of the micropores, the reaction provides a self-templating process for the formation of the micropores.

In some examples, the method excludes the use of a template. In these examples, the carbon particles formed by the method contain only micropores (i.e., the carbon particles do not contain mesopores or macropores). In an example, the bulk particle size (i.e., the size of the full particle) of the carbon particles formed by the method ranges from 1 μm to 500 μm. The pore size of these carbon particles (i.e., the microporous carbon) is less than 2 nm.

In some examples, the combining of the halogenide-hydrocarbon, the aprotic hydrocarbon solvent, and the reductant occurs in an inert environment (e.g., an environment containing argon gas, helium gas, etc.). The combining may be accomplished in an inert environment so that the halogenide-hydrocarbon reacts with the reductant to form the intermediate particles, rather than either the halogenide-hydrocarbon or the reductant undergoing an alternate reaction (e.g., the reductant undergoing a combustion reaction in the presence of oxygen).

After the intermediate particles are formed, the intermediate particles may be subjected to a heat treatment.

In some examples of the method, and in particular when the microporous carbon or the porous carbon particles with the hierarchical porous structure are to be nitrogen-doped, the intermediate particles may be soaked in an ammonia solution prior to being subjected to the heat treatment. Soaking may be accomplished for a time period that is sufficient to introduce a desired amount of nitrogen.

The heat treatment may cause further carbonization and de-hydrogenation of the intermediate particles and form the precursor to the microporous carbon. The carbonization and de-hydrogenation of the intermediate particles may produce additional byproduct(s). Some of these additional byproducts may leave the precursor as gases, such as carbon monoxide (CO), carbon dioxide ($CO_2$), nitrogen oxide (NO) (e.g., when the microporous carbon particles or the carbon particles with the hierarchical porous structure are to be nitrogen-doped), and hydrogen ($H_2$). Other additional byproducts may remain in the precursor until the precursor is subjected to a water wash or an acid wash. Examples of these additional byproducts (which are generally present in trace amounts) may be $Na_4SiO_4$, $K_4SiO_4$, $Na_2CO_3$, or $K_2CO_3$.

In an example, the heat treatment is accomplished at a heat treatment temperature ranging from about 300° C. to less than 1500° C. The heat treatment temperature may be at or above 300° C., as hydrogen-carbon (H—C) bond cleavage starts at about 300° C. The heat treatment temperature may be below 1500° C., as graphitization occurs at or above 1500° C. Graphitization essentially melts (i.e., removes, fills in) the micropores. It is believed that graphite nucleates and grows into the pores. As such, it is desirable for the heat treatment to be below a temperature at which graphitization occurs. In another example, the heat treatment temperature ranges from about 300° C. to about 600° C. In still another example, the heat treatment temperature is about 300° C.

In an example, the intermediate particles are subjected to the heat treatment for a heat treatment time period ranging from about 20 minutes to about 10 hours. In another example, the heat treatment time period is about 1 hour.

In some examples, the heat treatment occurs in the inert environment. The heat treatment may be accomplished in an inert environment so that the intermediate particles are further carbonized and de-hydrogenated, rather than undergoing an alternate reaction (e.g., an oxidation reaction in the presence of oxygen).

When the microporous carbon or the porous carbon particles with the hierarchical porous structure are to be nitrogen-doped, the heat treatment may be accomplished in an environment containing ammonia gas.

In some examples of the method disclosed herein, after the intermediate particles are subjected to the heat treatment and the precursor to the microporous carbon is formed, the precursor is subjected to a water wash to remove the byproduct(s) therefrom and to form the microporous carbon. The byproduct(s) may be the byproduct(s) of the reaction of the halogenide-hydrocarbon with the reductant or a byproduct of the carbonization and de-hydrogenation of the intermediate particles. For example, the byproduct may be the simple metal salt formed from the alkaline metal, the alkaline metal alloy, the alkaline earth metal, or the alkaline earth metal alloy (as the cation) and the halogen (as the anion) during the reaction of the halogenide-hydrocarbon and the reductant (e.g., when the reductant is the alkaline metal, the alkaline metal alloy, the alkaline earth metal, or the alkaline earth metal alloy). In this example, the simple metal salt byproduct may be removed from the precursor by subjecting the precursor to the water wash. The water wash may dissolve the simple metal salt byproduct and wash it away from the framework, leaving the microporous carbon. The removal of the byproduct may open up at least some of the micropores, e.g., those that had been occupied by the byproduct, and form the microporous carbon.

As mentioned above, some examples of the method include the use of a template. The template may be used to form the mesopores and/or the macropores among the microporous framework. In these examples, is to be understood that the mesopores and/or the macropores will be formed in addition to the micropores. More specifically, the micropores will form as a result of the previously described reaction, and the mesopores and/or macropores will form as a result of the template (i.e., the template occupies spaces that will become the mesopores and/or macropores upon removal of the template).

The template may be a nanopowder with a particle size that corresponds to the size of the mesopores and/or macropores to be formed. For example, if a silicon dioxide template with a particle size of about 15 nm is used, the porous carbon formed will have mesopores with a pore size of about 15 nm in addition to the micropores. When the mesopores are to be formed, the template may be a nanopowder with a particle size ranging from 2 nm to 50 nm. For another example, if a silicon dioxide template with a particle size of about 75 nm is used, the porous carbon formed will have macropores with a pore size of about 75 nm in addition to the micropores. When the macropores are to be formed, the template may be a nanopowder with a particle size greater than 50 nm.

The template may be any material that will form the desired mesopores and/or macropores, that can be removed from the carbon framework by a water wash or an acid wash, and that will not react with the halogenide-hydrocarbon, the aprotic hydrocarbon solvent, the reductant, the carbon framework, or any of the byproducts. In an example, the template is selected from the group consisting of silicon dioxide ($SiO_2$) nanopowder, titanium dioxide ($TiO_2$) nanopowder, aluminum oxide ($Al_2O_3$) nanopowder, iron (III) oxide ($Fe_2O_3$) nanopowder, and combinations thereof. In other examples, the template is a nanopowder with a particle size ranging from about 2 nm to about 50 nm or a nanopowder with a particle size greater than 50 nm. As an example of the latter template, the nanopowder has a particle size ranging from about 100 nm to about 200 nm. In still another example, the template includes a first nanopowder with a particle size ranging from about 2 nm to about 50 nm and a second nanopowder with a particle size ranging from about 100 nm to about 200 nm.

In an example, the template is a nanopowder with a particle size ranging from 2 nm to 50 nm, and the mesopores are formed with a pore size ranging from 2 nm to 50 nm. In another example, the template is a nanopowder with a particle size ranging from about 100 nm to about 200 nm, and the macropores are formed with a pore size ranging from about 100 nm to about 200 nm. In still another example, the template includes a first nanopowder with a particle size ranging from 2 nm to 50 nm and a second nanopowder with a particle size ranging from about 100 nm to about 200 nm, the mesopores are formed with a pore size ranging from 2 nm to 50 nm, and the macropores are formed with a pore size ranging from about 100 nm to about 200 nm.

In an example, when the method includes the use of the template, the combining of the halogenide-hydrocarbon, the aprotic hydrocarbon solvent, and the reductant may involve multiple steps. For example, the combining may include mixing the halogenide-hydrocarbon, the aprotic hydrocarbon solvent, and the template to form a mixture, and then adding the reductant to the mixture to initiate the reaction and form the intermediate particles (wherein the template enables the formation of mesopores, macropores, or combinations thereof). For another example, the combining may include mixing the halogenide-hydrocarbon and the aprotic hydrocarbon solvent to form a mixture, adding the template to the mixture, and then adding the reductant to the mixture to initiate the reaction and form intermediate particles (wherein the template enables the formation of mesopores, macropores, or combinations thereof).

When the method includes the use of the template, the halogenide-hydrocarbon, the aprotic hydrocarbon solvent, and the reductant may be any of the materials previously described. More particularly, when the method includes the use of the template, the halogenide-hydrocarbon is selected from the group consisting of dichloromethane, trichloromethane, tetrachloromethane, tribromomethane, vinyl chloride, 1-chlorobutane, and combinations thereof; the aprotic hydrocarbon solvent is selected from the group consisting of toluene, hexane, cyclohexane, and combinations thereof; and the reductant is selected from the group consisting of lithium metal, a lithium metal alloy, sodium metal, a sodium metal alloy, potassium metal, a potassium metal alloy, rubidium metal, a rubidium metal alloy, caesium metal, a caesium metal alloy, francium metal, a francium metal alloy, beryllium metal, a beryllium metal alloy, magnesium metal, a magnesium metal alloy, calcium metal, a calcium metal alloy, strontium metal, a strontium metal alloy, barium metal, a barium metal alloy, radium metal, a radium metal alloy, and combinations thereof. In this example, any of the nitrogen-containing halogenide-hydrocarbons may be used instead of or in combination with the previously mentioned halogenide-hydrocarbon.

In some examples, no other components are combined with the halogenide-hydrocarbon, the aprotic hydrocarbon solvent, the template, and the reductant. In these examples, the final mixture (i.e., the mixture containing all of the halogenide-hydrocarbon, the aprotic hydrocarbon solvent, the template, and the reductant added just prior to the initiation of any reaction (e.g., the reaction that forms the intermediate particles)) consists of the halogenide-hydrocarbon, the aprotic hydrocarbon solvent, the template, and the reductant.

When the template is included, the final mixture may include from about 1 wt % to about 99 wt % of the halogenide-hydrocarbon; from about 1 wt % to about 99 wt % of the aprotic hydrocarbon solvent; from about 10 wt % to about 99 wt % of the template; and from about 1 wt % to about 99 wt % of the reductant (the amount of which depends on the amount of the halogenide-hydrocarbon as previously described) (each of which is based on the total wt % of the final mixture). It is to be understood that the amount of the template used may depend, at least in part, on the volume of the final carbon framework that is to be occupied by mesopores and/or macropores.

When the template is used in the method, the addition of the reductant to the mixture initiates the reaction that forms the intermediate particles. The halogenide-hydrocarbon reacts with the reductant to form the intermediate particles (i.e., the carbon or hydrocarbon framework that has micropores (containing byproduct(s)) formed in and/or between walls thereof) around the template. The presence (and ultimately the removal) of the template forms the mesopores and/or the macropores among the microporous carbon. These porous carbon particles will be described further hereinbelow.

As mentioned above, after the intermediate particles are formed (which, in this example, has the template integrated among the microporous framework), it may be subjected to a heat treatment. In these examples then, the template is subjected to the heat treatment when the intermediate particles are subjected to the heat treatment. The heat treatment may cause further carbonization and de-hydrogenation of the intermediate particles, and forms the precursor. When the template is used, it may be desirable to select a heat treatment temperature that is below the melting point of the template material. For example, when silicon nanopowder is used, it may be desirable for the heat treatment temperature to be between about 300° C. and about 1400° C. In these examples then, the heat treatment temperature may also depend upon the template material that is used.

In examples of the method involving the template, the combining and/or the heat treatment may occur in an inert environment.

In some examples of the method disclosed herein, the method may further comprise subjecting the precursor (which, in this example, includes the byproduct in the micropores and the template in the meso and/or macropores) to an acid wash to remove the byproduct and the template. After the intermediate particles are subjected to the heat treatment, the precursor is subjected to the water wash and/or the acid wash to remove the byproduct and the template. In an example, an aqueous solution of acid may be used to wash the precursor. The water in the solution may dissolve the byproduct (e.g., the simple metal salt byproduct, which may open up some of the micropores) and the acid may react with the template. For example, when the template is silicon dioxide, it may be removed with an aqueous 5 wt % hydrofluoric acid solution according to the following reaction (I):

$$SiO_2 + 4HF \rightarrow 2H_2O + SiF_4 \qquad (I).$$

As mentioned above, porous carbon particles with a hierarchical porous structure may be formed by examples of the method. In particular, the porous carbon particles with the hierarchical porous structure may be formed when the template is used along with the other starting materials and the solvent. The carbon particles with the hierarchical porous structure that are formed by the method comprise: a primary microporous structure; and at least one of: a secondary mesoporous structure, or a secondary macroporous structure, wherein each of the carbon particles has a bulk particle size ranging from 1 μm to 500 μm. More particularly, when the mesopores and/or the macropores are formed among the microporous carbon, the resulting porous carbon particles have a hierarchical porous structure comprising: a primary microporous structure (wherein each micropore has a pore size of less than 2 nm); and at least one of: a secondary mesoporous structure (wherein each mesopore has a pore size ranging from 2 nm to 50 nm), or a secondary macroporous structure (wherein each macropore has a pore size greater than 50 nm). In some examples, carbon particles with the hierarchical porous structure include the primary microporous structure and the secondary mesoporous structure (and no secondary macroporous structure). In some other examples, carbon particles with the hierarchical porous structure include the primary microporous structure and the secondary macroporous structure (and no secondary mesoporous structure). In still some other examples, carbon particles with the hierarchical porous structure include the primary microporous structure, the secondary mesoporous structure, and the secondary macroporous structure. In any of these examples, each of the carbon particles with the hierarchical porous structure has a bulk particle size ranging from 1 μm to 500 μm.

As mentioned in some examples, the method disclosed herein may be used to form nitrogen-doped microporous carbon particles, such as nitrogen-doped microporous carbon or nitrogen-doped porous carbon particles with the hierarchical porous structure. In these examples, the nitrogen of the nitrogen-doped carbon materials may be used as an active site for some reactions. As a specific example, the nitrogen of the nitrogen-doped carbon materials may be used as an electrocatalyst for oxygen reduction. To reiterate, when the microporous carbon or the porous carbon particles with the hierarchical porous structure are to be nitrogen-doped, the method(s) disclosed herein further comprise doping the precursor by one of several techniques. As examples, doping the precursor is accomplished by one: using a nitrogen-containing halogenide-hydrocarbon as the halogenide-hydrocarbon, or performing the heat treatment in an environment containing ammonia gas; or soaking the intermediate particles in an ammonia solution prior to the subjecting of the intermediate particles to the heat treatment.

In some examples, the method may further comprise incorporating the carbon particles (either the microporous carbon particles or the carbon particles with the hierarchical porous structure) into an electric double-layer capacitor (EDLC), an asymmetrical supercapacitor, a lithium-sulfur battery, a lithium-selenium battery, or a gas storage system.

Electric double-layer capacitors and asymmetrical supercapacitors are types of supercapacitors that store electrical energy by separating and transferring charge at the interface of an electrode and an electrolyte. Lithium-sulfur batteries and lithium-selenium batteries are types of lithium-based batteries that store and discharge electrical energy by reversibly passing lithium ions between a negative electrode (sometimes called an anode) and a positive electrode (sometimes called a cathode).

The microporous carbon particles or the carbon particles with the hierarchical porous structure formed via the methods disclosed herein may be used to form a positive electrode of an electric double-layer capacitor, an asymmetrical supercapacitor, a lithium-sulfur battery, or a lithium-selenium battery. In an example, the positive electrode may be made by mixing the microporous carbon particles or the carbon particles with the hierarchical porous structure with a polymer binder and a conductive filler. When the positive electrode is to be incorporated into a lithium-sulfur battery or a lithium-selenium battery, the microporous carbon or the carbon particles with the hierarchical porous structure may be used to form a composite with sulfur or selenium (respectively) before being mixed with the polymer binder and the conductive filler. The composite(s) may be formed by loading sulfur or selenium into the pores of the microporous carbon or the carbon particles with the hierarchical porous structure The polymer binder structurally holds the components of the positive electrode together. Some examples of suitable polymer binders include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders include polyvinyl alcohol (PVA), sodium alginate, or other water-soluble binders.

The conductive filler may be a conductive carbon material. The conductive carbon may be a high surface area carbon, such as acetylene black or another carbon material (e.g., Super P). Other examples of suitable conductive fillers include porous carbon (e.g., AX-21) graphene, graphite, carbon nanotubes, and/or carbon nanofibers. The conductive filler ensures electron conduction between the positive-side current collector and the microporous carbon particles or the carbon particles with the hierarchical porous structure (and/or the sulfur or selenium) in the positive electrode.

When the positive electrode is to be incorporated into the electric double-layer capacitor or the asymmetrical supercapacitor, the microporous carbon particles or the carbon particles with the hierarchical porous structure may be present in the mixture in an amount ranging from greater than 0 wt % up to 99 wt % (based on the total solid wt % of the dispersion/mixture). When the positive electrode is to be incorporated into the lithium-sulfur battery or the lithium-selenium battery, the composite formed from the microporous carbon particles or the carbon particles with the hierarchical porous structure with the sulfur or selenium may be present in the mixture in an amount ranging from greater than 0 wt % up to 99 wt % (based on the total solid wt % of the dispersion/mixture). Each of the conductive filler and the binder may be present in an amount ranging from 0 wt % to about 99 wt %. In an example, the mixture may include from about 50 wt % to about 95 wt % (based on total solid wt % of the dispersion/mixture) of the microporous carbon particles or the carbon particles with the hierarchical porous structure, from about 5 wt % to about 20 wt % (based on total solid wt % of the dispersion/mixture) of the conductive filler, and from about 5 wt % to about 20 wt % (based on total solid wt % of the dispersion/mixture) of the binder. In another example, the mixture may include from about 50 wt % to about 95 wt % (based on total solid wt % of the dispersion/mixture) of the composite formed from the microporous carbon particles or the carbon particles with the hierarchical porous structure with the sulfur or selenium, from about 5 wt % to about 20 wt % (based on total solid wt % of the dispersion/mixture) of the conductive filler, and from about 5 wt % to about 20 wt % (based on total solid wt % of the dispersion/mixture) of the binder. All of these components may be manually mixed by dry-grinding.

After all these components are ground together, the ground components are combined with water or organic solvent (depending on the binder used) to form a dispersion/slurry. In an example, the solvent is a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

The dispersion may be mixed by milling. Milling aids in transforming the dispersion into a coatable slurry. Low-shear milling or high-shear milling may be used to mix the dispersion. The dispersion milling time ranges from about 10 minutes to about 20 hours depending on the milling shear rate. In an example, a rotator mixer is used for about 20 minutes at about 2000 rpm to mill the dispersion.

The slurry is then deposited onto a support. In an example, the support is a positive-side current collector. It is to be understood that the positive-side current collector may be formed from aluminum, or any other appropriate electrically conductive material known to skilled artisans. The support that is selected should be capable of collecting and moving free electrons to and from an external circuit connected thereto.

The slurry may be deposited using any suitable technique. As examples, the slurry may be cast on the surface of the support, or may be spread on the surface of the support, or may be coated on the surface of the support using a slot die coater.

The deposited slurry may be exposed to a drying process in order to remove any remaining solvent and/or water. Drying may be accomplished using any suitable technique. For example, the drying is conducted at ambient conditions (i.e., at room temperature, about 18° C. to 22° C., and 1 atmosphere). Drying may be performed at an elevated temperature ranging from about 60° C. to about 150° C. In some examples, vacuum may also be used to accelerate the drying process. As one example of the drying process, the deposited slurry may be exposed to vacuum at about 120° C. for about 12 to 24 hours.

The drying process results in the formation of the positive electrode. In an example, the thickness of the dried slurry (i.e., positive electrode) ranges from about 5 μm to about 200 m. In another example, the thickness of the dried slurry (i.e., positive electrode) ranges from about 10 μm to about 100 μm.

During the formation of the positive electrode, the water and/or organic solvent(s) is/are removed, and thus the resulting positive electrode may include from about 50 wt % to about 95 wt % (based on total wt % of the electrode) of the microporous carbon particles or the carbon particles with the hierarchical porous structure, from about 5 wt % to about 20 wt % (based on total wt % of the electrode) of the conductive filler, and from about 5 wt % to about 20 wt % (based total wt % of the electrode) of the binder. In another example, the resulting positive electrode may include from about 25 wt % to about 45 wt % (based on total wt % of the electrode) of the microporous carbon particles or the carbon particles with the hierarchical porous structure, from about 25 wt % to about 45 wt % (based on total wt % of the electrode) of sulfur or selenium, from about 5 wt % to about 20 wt % (based on total wt % of the electrode) of the conductive filler, and from about 5 wt % to about 20 wt % (based on total wt % of the electrode) of the binder.

The positive electrode (including the microporous carbon particles or the carbon particles with the hierarchical porous structure) may then be used in the electric double-layer capacitor, the asymmetrical supercapacitor, the lithium-sulfur battery or the lithium-selenium battery. When the positive electrode is incorporated into the electric double-layer capacitor, the asymmetrical supercapacitor, the lithium-sulfur battery, or the lithium-selenium battery, the capacitor or battery may be assembled with the positive electrode, a negative electrode, a porous polymer separator positioned between the negative and positive electrodes, and an electrolyte.

The negative electrode for the electric double-layer capacitor or the asymmetrical supercapacitor may be lithium metal.

The negative electrode for the lithium-sulfur battery or the lithium-selenium battery may include an active material, the binder (as described above), and the conductive filler (as described above). Examples of suitable active materials for the negative electrode for the lithium-sulfur battery or the lithium-selenium battery include any lithium host active material that can sufficiently undergo lithium intercalation and deintercalation, or lithium alloying and dealloying, or lithium insertion and deinsertion, while copper or another current collector functions as the negative terminal of the electrochemical cell. Examples of the lithium host active material include graphite, silicon-based materials, such as silicon alloys, or lithium-based materials. Further examples include tin, alloys of tin, antimony, and alloys of antimony. Graphite exhibits favorable lithium intercalation and deintercalation characteristics, is relatively non-reactive, and can store lithium in quantities that produce a relatively high energy density. Commercial forms of graphite that may be used to fabricate the negative electrode are available from, for example, Timcal Graphite & Carbon (Bodio, Switzerland), Lonza Group (Basel, Switzerland), or Superior Graphite (Chicago, Ill.). Examples of the silicon-based active material include crystalline silicon, amorphous silicon, silicon oxide ($SiO_x$), silicon alloys (e.g., Si—Sn), etc. The silicon active material may be in the form of a powder, particles, etc. ranging from nano-size to micro-size. Examples of the lithium-based materials include lithium foil, lithium alloys, or lithium titanate. When lithium foil is used, the polymer binder and conductive filler may not be included in the negative electrode.

The negative electrode for the lithium-sulfur battery or the lithium-selenium battery may include up to 90 wt % of the active material and up to 20 wt % of each of the conductive filler and binder. In an example, the negative electrode includes from about 70 wt % to about 90 wt % of the active material, from about 5 wt % to about 15 wt % of the conductive filler, and from about 5 wt % to about 15 wt % of the binder.

The negative electrode for the lithium-sulfur battery or the lithium-selenium battery may be purchased or formed. In an example, the negative electrode may be formed by making a slurry of active material particles, binder, and conductive filler in water and/or a polar aprotic solvent. The process of making the negative electrode may be the same as or similar to the process of making the positive electrode described above.

If the negative electrode for the lithium-sulfur battery or the lithium-selenium battery is not formed of lithium, the negative electrode may be exposed to a pre-lithiation process prior to incorporating it into the electrochemical cell/battery. The pre-lithiation technique lithiates the negative electrode. In an example, the negative electrode may then be pre-lithiated using a half cell. More specifically, the half cell is assembled using the negative electrode, which is soaked in a suitable electrolyte, which includes a solvent and a lithium salt. The half cell includes a counter electrode, and a voltage potential is applied to the half cell. The application of the voltage causes lithium metal to penetrate the negative electrode. After pre-lithiation is complete, the half cell is disassembled and the pre-lithiated negative electrode may be washed using a suitable solvent, such as DME.

The porous polymer separator the electric double-layer capacitor, the asymmetrical supercapacitor, the lithium-sulfur battery, or the lithium-selenium battery may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators include single layer polypropylene membranes, such as CELGARD 2400 and CELGARD 2500 from Celgard, LLC (Charlotte, N.C.). It is to be understood that the porous separator may be coated or treated, or uncoated or untreated. For example, the porous separator may or may not be coated or include any surfactant treatment thereon.

In other examples, the porous separator may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator is poly(p-hydroxybenzoic acid). In yet another example, the porous separator may be chosen from a combination of the polyolefin (such as PE and/or PP) and one or more of the other polymers listed above.

The porous separator may be a single layer or may be a multi-layer (e.g., bilayer, trilayer, etc.) laminate fabricated from either a dry or wet process. The porous separator operates as an electrical insulator (preventing the occurrence of a short), a mechanical support, and a barrier to prevent physical contact between the two electrodes. The porous separator also ensures passage of lithium ions (identified by the Li$^+$) through the electrolyte filling its pores.

The positive electrode, the negative electrode, and the porous separator are soaked with the electrolyte, including a solvent suitable for the battery and a lithium salt.

In an example, the solvent suitable for the electric double-layer capacitor, the asymmetrical supercapacitor, the lithium sulfur battery, or the lithium-selenium battery may be an ionic liquid. When the ionic liquid is used as the solvent, the ionic liquid may include a cation and an anion. The cation may be selected from the group consisting of a pyrrolidinium-based cation, a piperidinium-based cation, and combinations thereof. In an example, the cation may have a vinyl or allyl group thereon. Some specific examples of the cation include 1-allyl-1-methylpyrrolidinium, 1-allyl-1-methylpiperidinium, and combinations thereof. The anion may be a fluorosulfonyl imide-based anion. Some specific examples of the anion include bis(fluorosulfonyl)imide, bis(trifluoromethanesulfonyl)imide, and combinations thereof.

In another example, the solvent suitable for the lithium sulfur battery or the lithium-selenium battery may be an ether-based solvent. Examples of the ether-based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), ethyl ether, aliphatic ethers, polyethers, and mixtures thereof.

Examples of the lithium salt that may be dissolved in the ionic liquid solvent(s) and/or in the ether(s) include LiPF$_6$, LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$ (LIFSI), LiN(CF$_3$SO$_2$)$_2$ (LITFSI or lithium bis(trifluoromethylsulfonyl)imide), LiB(C$_2$O$_4$)$_2$ (LiBOB), LiBF$_2$(C$_2$O$_4$) (LiODFB), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiNO$_3$, and mixtures thereof.

As mentioned above, the microporous carbon or the porous carbon particles with the hierarchical porous structure formed via the methods disclosed herein may also be used in a gas storage system. The microporous carbon particles or the carbon particles with the hierarchical porous structure may facilitate gas by adsorbing the gas. Examples of gases that the microporous carbon or the porous carbon particles with the hierarchical porous structure may adsorb include methane, natural gas, carbon dioxide, butane, hydrogen, etc. The gases that the microporous carbon or the porous carbon particles with the hierarchical porous structure may adsorb may depend, in part on the pore size distribution of the microporous carbon or the porous carbon particles with the hierarchical porous structure.

To further illustrate the present disclosure, examples are given herein. It is to be understood that these examples are provided for illustrative purposes and are not to be construed as limiting the scope of the disclosure.

EXAMPLES

Example 1

An example of the method was used to prepare the microporous carbon. Trichloromethane was used as the halogenide-hydrocarbon. Toluene was used as the aprotic hydrocarbon solvent, and a sodium-potassium metal alloy with a weight ratio of sodium to potassium of 1:1 was used as the reductant.

Trichloromethane and toluene were combined at a weight ratio of trichloromethane to toluene of 1:50. Then, the sodium-potassium metal alloy was added to the trichloromethane and toluene mixture at a mole ratio of 3:1 of the sodium-potassium metal alloy to trichloromethane. No template was added. The trichloromethane and the sodium-potassium metal alloy reacted to form the intermediate particles, sodium chloride salt (which was present in at least some of the micropores), and potassium chloride salt (which was present in at least some other of the micropores). Both of the salt byproducts may have been present in some of the same micropores.

The intermediate particles formed were subjected to a heat treatment at 300° C. for 1 hour to form the precursor to the microporous carbon (i.e., further carbonized and dehydrogenated carbon with the salt byproducts in at least some of the micropores). Then, the precursor was subjected to a water wash to remove the sodium chloride salt and the potassium chloride salt and form the microporous carbon.

Figure 2A:
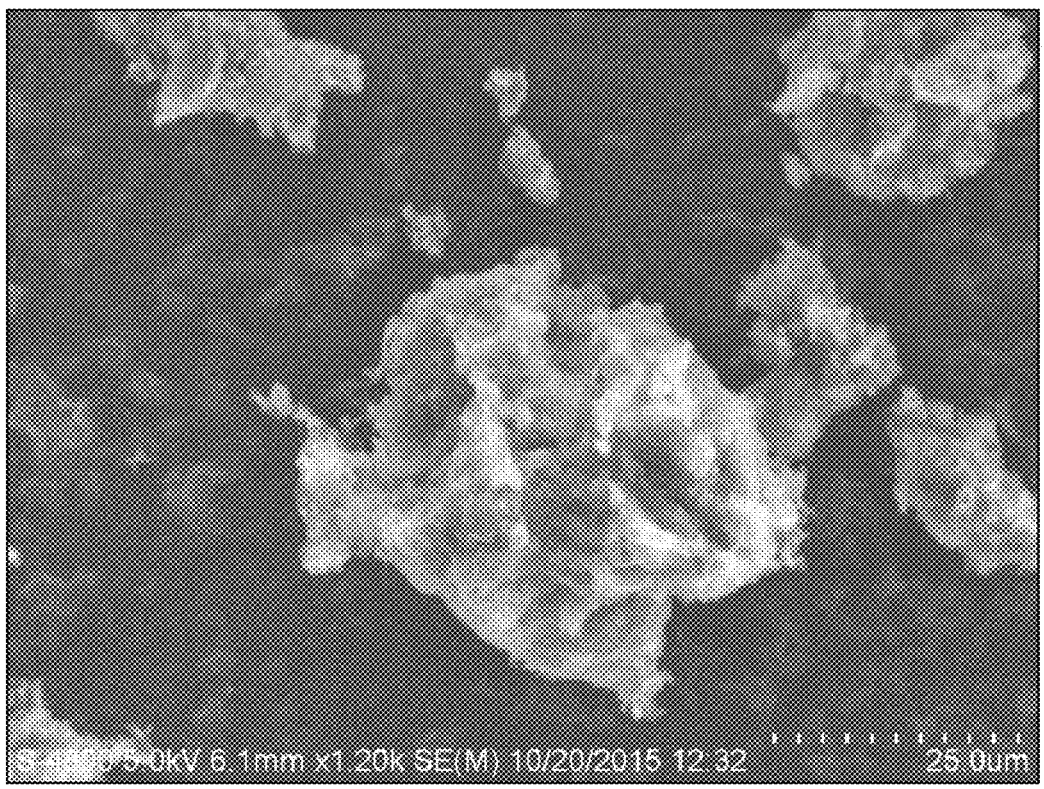
FIGS. 2A and 2B are scanning electron microscope ("SEM") images, using a scalar bar of 25.0 μm and 1.20 μm, respectively, of examples of the microporous carbon formed from an example of the method disclosed herein.
Figure 2B:
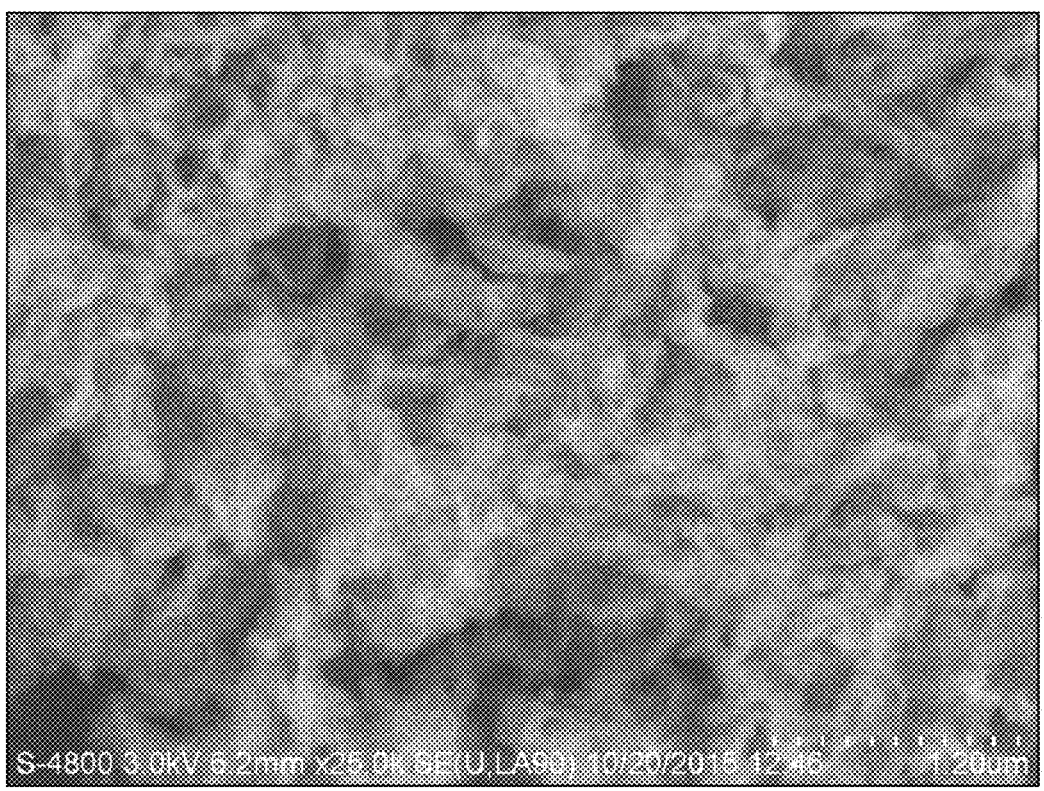

The microporous carbon formed had a BET (Brunauer-Emmett-Teller) surface area of 1613.31 m$^2$/g, a micropore volume of 3.974 cm$^3$/g, and a micropore size of about 1.1 nm. Two SEM images were taken of the microporous carbon, and are shown in FIGS. 2A and 2B. FIGS. 2A and 2B clearly illustrate the microporous structure of the microporous carbon.

Example 2

An example of the method was used to prepare the carbon particles with the hierarchical porous structure. Trichloromethane was used as the halogenide-hydrocarbon. Toluene was used as the aprotic hydrocarbon solvent. Silicon dioxide nanopowder with a particle of about 100 nm to 200 nm was used as the template, and a sodium-potassium metal alloy with a weight ratio of sodium to potassium of 1:1 was used as the reductant.

Trichloromethane, toluene, and the silicon dioxide nanopowder were combined at a weight ratio of trichloromethane to toluene of 1:50 and a weight ratio of trichloromethane to silicon dioxide nanopowder of 1:1. Then, the sodium-potassium metal alloy was added to the trichloromethane, toluene, and silicon dioxide nanopowder mixture at a mole ratio of 3:1 of the sodium-potassium metal alloy to trichloromethane. The trichloromethane and the sodium-potassium metal alloy reacted to form the intermediate particles, sodium chloride salt in at least some of the micropores, and potassium chloride salt in at least some of the micropores. Both of the salt byproducts may have been present in some of the same micropores.

The intermediate particles were subjected to a heat treatment at 300° C. to 600° C. for 1 hour to form the precursor to the microporous carbon (i.e., further carbonized and dehydrogenated carbon with the salt byproducts in at least some of the micropores, and, in this example, the silicon dioxide nanopowder in the macropores). Then, the precursor was subjected to an acid wash to remove the silicon dioxide nanopowder, the sodium chloride salt, and the potassium chloride salt and form the porous carbon particles with the hierarchical porous structure. An aqueous 5 wt % hydrofluoric acid solution was used as the acid for the acid wash.

Figure 3A:
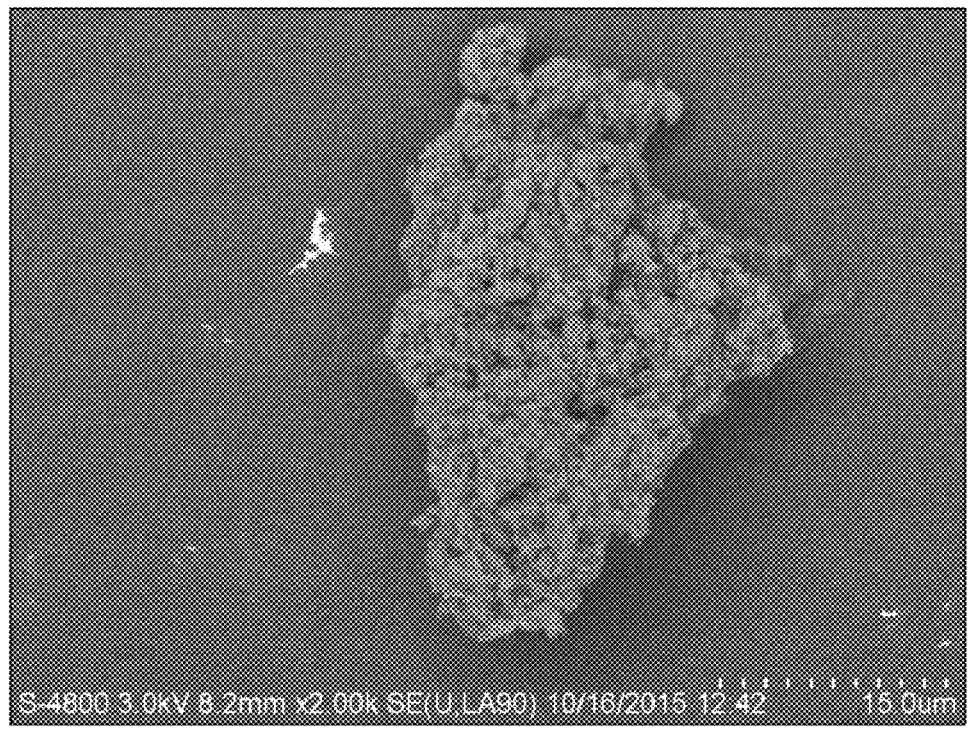
FIGS. 3A and 3B are SEM images, using a scalar bar of 15.0 μm and 2.00 μm, respectively, of example carbon particles with the hierarchical porous structure formed from an example of the method disclosed herein.
Figure 3B:
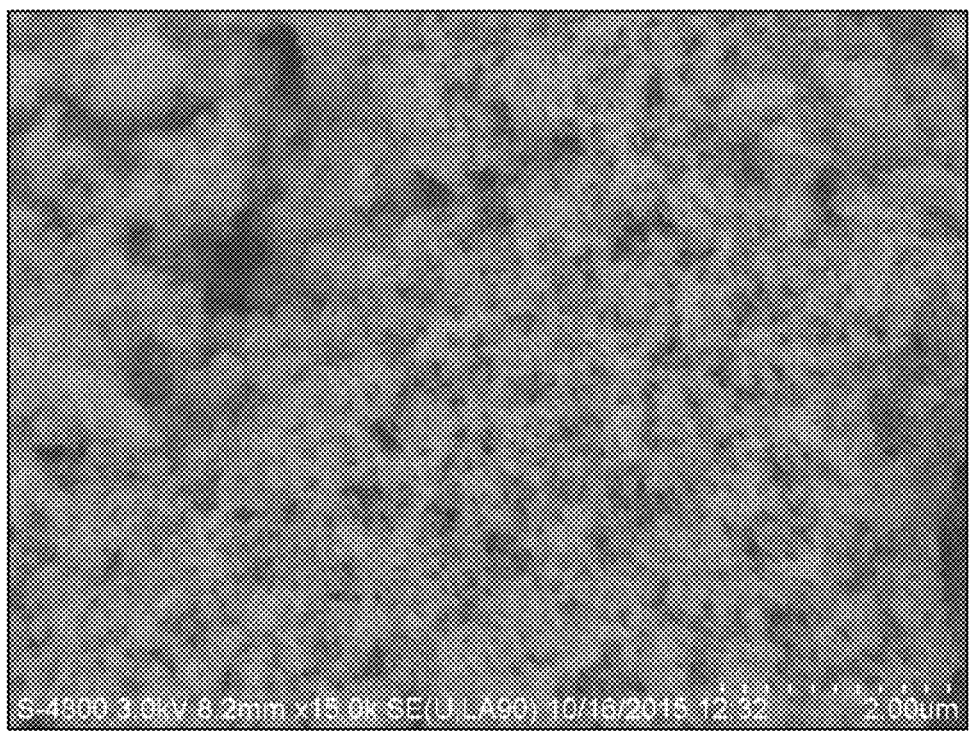

The carbon particles with the hierarchical porous structure formed had a BET (Brunauer-Emmett-Teller) surface area of 1032.06 m$^2$/g, a micropore volume of 2.766 cm$^3$/g, a micropore size of about 1.1 nm, and a macropore size of about 100 nm to 200 nm. Two SEM images were taken of the carbon particles with the hierarchical porous structure, and are shown in FIGS. 3A and 3B. FIGS. 3A and 3B clearly illustrate the hierarchical porous structure of the carbon particles.

Example 3

Porous carbon particles with the hierarchical porous structure formed in example 2 were incorporated into an example positive electrode. Sulfur was loaded into the pores of the carbon particles to form a composite with the carbon particles, and then, the sulfur-carbon composite was incorporated into the example positive electrode. The sulfur-carbon composite included 79 wt % sulfur based on the total wt % of the sulfur-carbon composite.

The positive electrode included the sulfur-carbon composite in an amount greater than 60 wt %. In addition to the sulfur-carbon composite, the positive electrode included conductive filler and polymer binder.

The positive electrode was used with a lithium foil negative electrode. Microporous tri-layered polypropylene (PP) and polyethylene (PE) polymer membranes (CELGARD 2032, available from Celgard) was used as the separator. The electrolyte consisted of 1M LiTFSI in a solution of 1,3-dioxolane (DOL) and dimethoxyethane (DME) at a volume ration of 1:1, and 2 wt % of LiNO$_3$.

Figure 4:
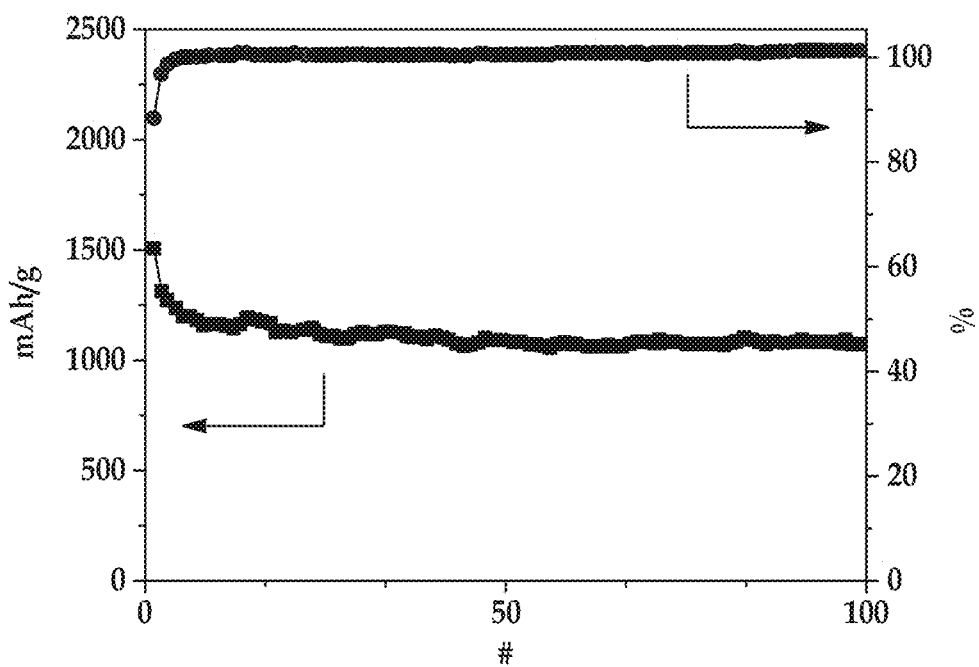
FIG. 4 is a graph depicting the specific capacity (mAh/g, left Y axis) versus the cycle number (#, X axis) and Coulombic efficiency (%, right Y axis) versus the cycle number (#, X axis) for an example positive electrode including example carbon particles with the hierarchical porous structure.

FIG. 4 depicts specific capacity (mAh/g, left Y axis) versus the cycle number (#, X axis) for the example positive electrode. As shown by the lower arrow, the specific capacity values are shown in the lower half of the graph. FIG. 4 also depicts the Coulombic efficiency (%, right Y axis) versus the cycle number (X axis) for the example positive electrode. As shown by the upper arrow, the Coulombic efficiency values are shown in the upper half of the graph. As shown in FIG. 4, the example positive electrode has a high specific capacity (i.e., a specific capacity greater than 1000 mAh/g) and good cycling stability (i.e., over 80% retention after 100 cycles).

Figure 5:
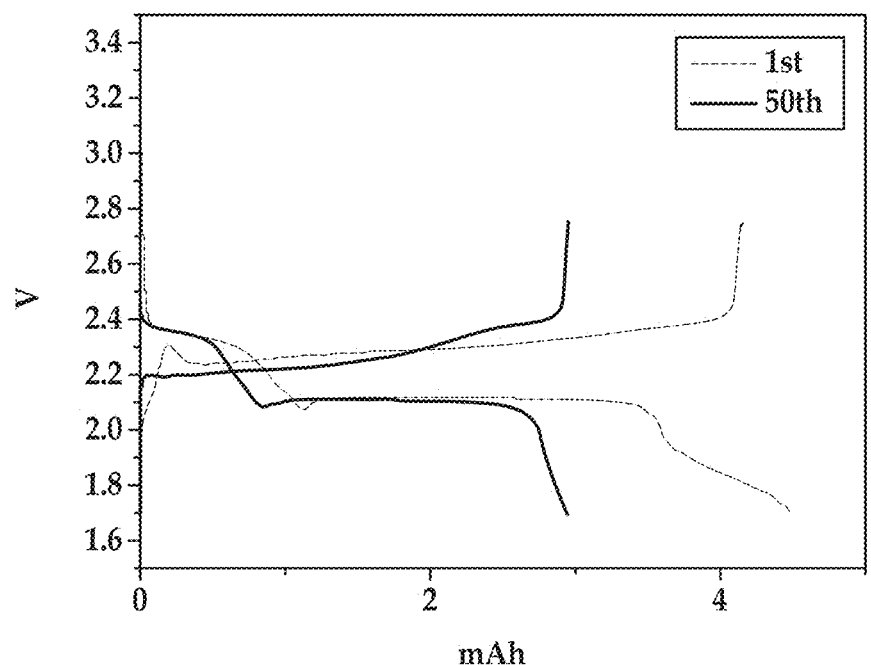
FIG. 5 is a graph depicting the voltage (V, Y axis) versus capacity (mAh, X axis) for an example positive electrode including example carbon particles with the hierarchical porous structure.

FIG. 5 depicts the voltage (V, Y axis) versus capacity (mAh, left X axis) of the example positive electrode. The first voltage profile (1st) and the fiftieth voltage profile (50$^{th}$) are shown. The main discharge voltage plateau of the 50$^{th}$ cycle was similar to that of the 1$^{st}$ cycle, which suggests a good conductivity maintained by the porous carbon framework in the example positive electrode.

Example 4

Carbon particles with the hierarchical porous structure formed in example 2 were incorporated into another example positive electrode. Selenium was loaded into the pores of the carbon particles to form a composite with the carbon particles, and then, the selenium-carbon composite was incorporated into the example positive electrode. The selenium-carbon composite included 76 wt % selenium based on the total wt % of the selenium-carbon composite.

Comparative carbon particles (formed via a different method) were incorporated into a comparative positive electrode. Selenium was loaded into the pores of the comparative carbon particles to form a composite with the comparative carbon particles, and then, the comparative selenium-carbon composite was incorporated into the comparative positive electrode.

The positive electrodes included the selenium-carbon composites in an amount greater than 60 wt %. In addition to the selenium-carbon composites, the positive electrodes included conductive filler and polymer binder.

Each of the positive electrodes was used with a lithium foil negative electrode. Microporous tri-layered polypropylene (PP) and polyethylene (PE) polymer membranes (CELGARD 2032, available from Celgard) was used as the separator. The electrolyte consisted of 1M LiTFSI in a solution of 1,3-dioxolane (DOL) and dimethoxyethane (DME) at a volume ration of 1:1, and 2 wt % of LiNO$_3$.

Figure 6:
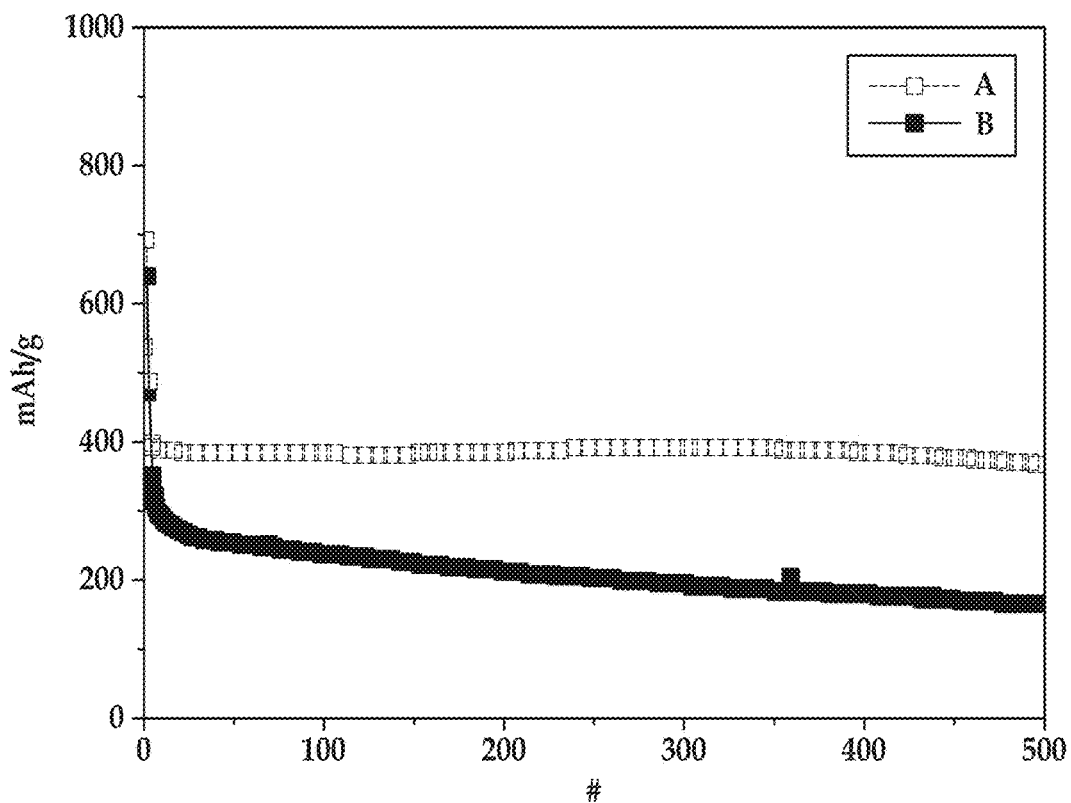
FIG. 6 is a graph depicting the specific capacity (mAh/g, Y axis) versus the cycle number (#, X axis) for an example positive electrode (A) including example carbon particles with the hierarchical porous structure and a comparative positive electrode (B)
Figure 7:
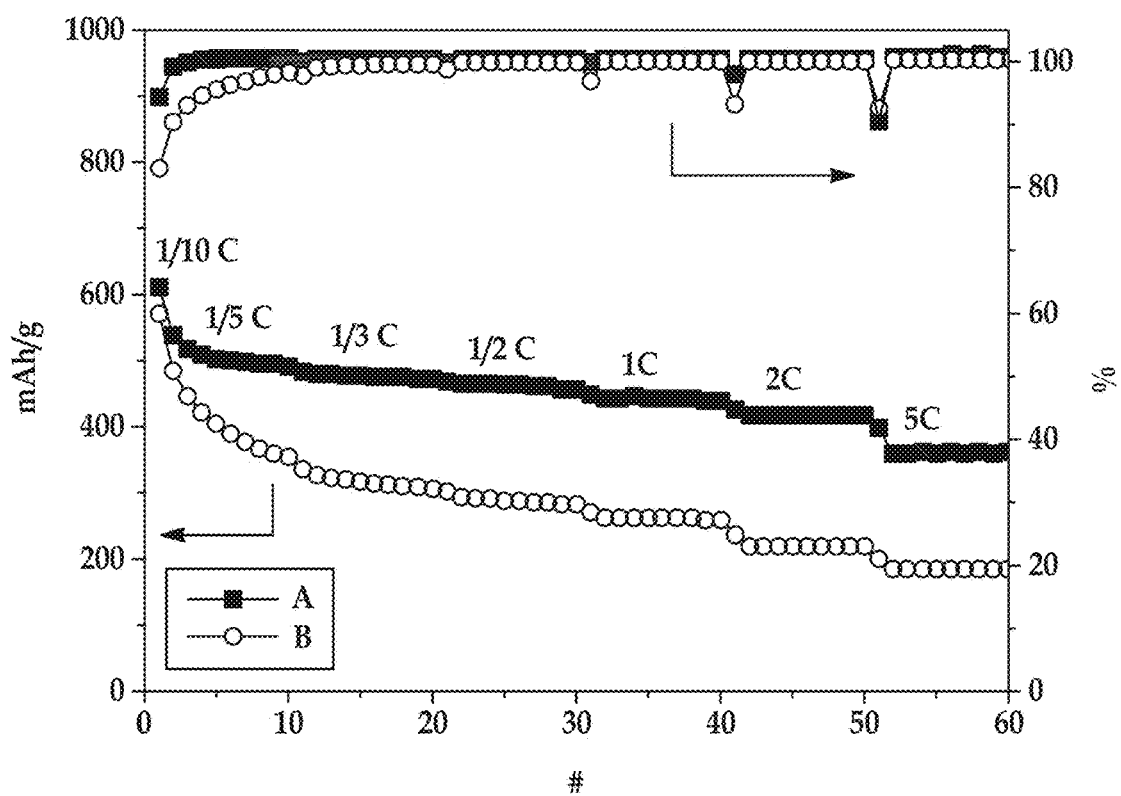
FIG. 7 is a graph depicting the specific capacity (mAh/g, left Y axis) versus the cycle number (#, X axis) and Coulombic efficiency (%, right Y axis) versus the cycle number (#, X axis) for the example positive electrode (A) including example carbon particles with the hierarchical porous structure and the comparative positive electrode (B)

FIG. 6 depicts specific capacity (mAh/g) versus the cycle number (#, X axis) for the example positive electrode (A) and comparative positive electrode (B). FIG. 7 also depicts specific capacity (mAh/g, left Y axis) versus the cycle number (X axis) for the example positive electrode (A) and comparative positive electrode (B). As shown by the lower arrow, the specific capacity values are shown in the lower half of the graph. FIG. 7 also shows the C-rate of the specific capacity values of the example positive electrode (A). A C-rate is a measure of the rate at which a battery is discharged relative to its maximum capacity. A 1 C rate means that the discharge current will discharge the entire battery in 1 hour. For a battery with a capacity of 100 Amp-hrs, this equates to a discharge current of 100 Amps. As shown in FIG. 6, the example positive electrode (A) has good cycling stability (i.e., over 92% retention after 500 cycles). And as shown in FIGS. 6 and 7, the specific capacity (A) of the example positive electrode is much greater compared to the specific capacity (B) of the comparative example positive electrode.

FIG. 7 also depicts the Coulombic efficiency (%, right Y axis) versus the cycle number (X axis) for the example positive electrode (A) and comparative positive electrode (B). As shown by the upper arrow, the Coulombic efficiency values are shown in the upper half of the graph. As shown, in FIG. 7 the Coulombic efficiency of the example positive electrode (A) is comparable to the Coulombic efficiency of the comparative positive electrode (B).

Example 5

Figure 8:
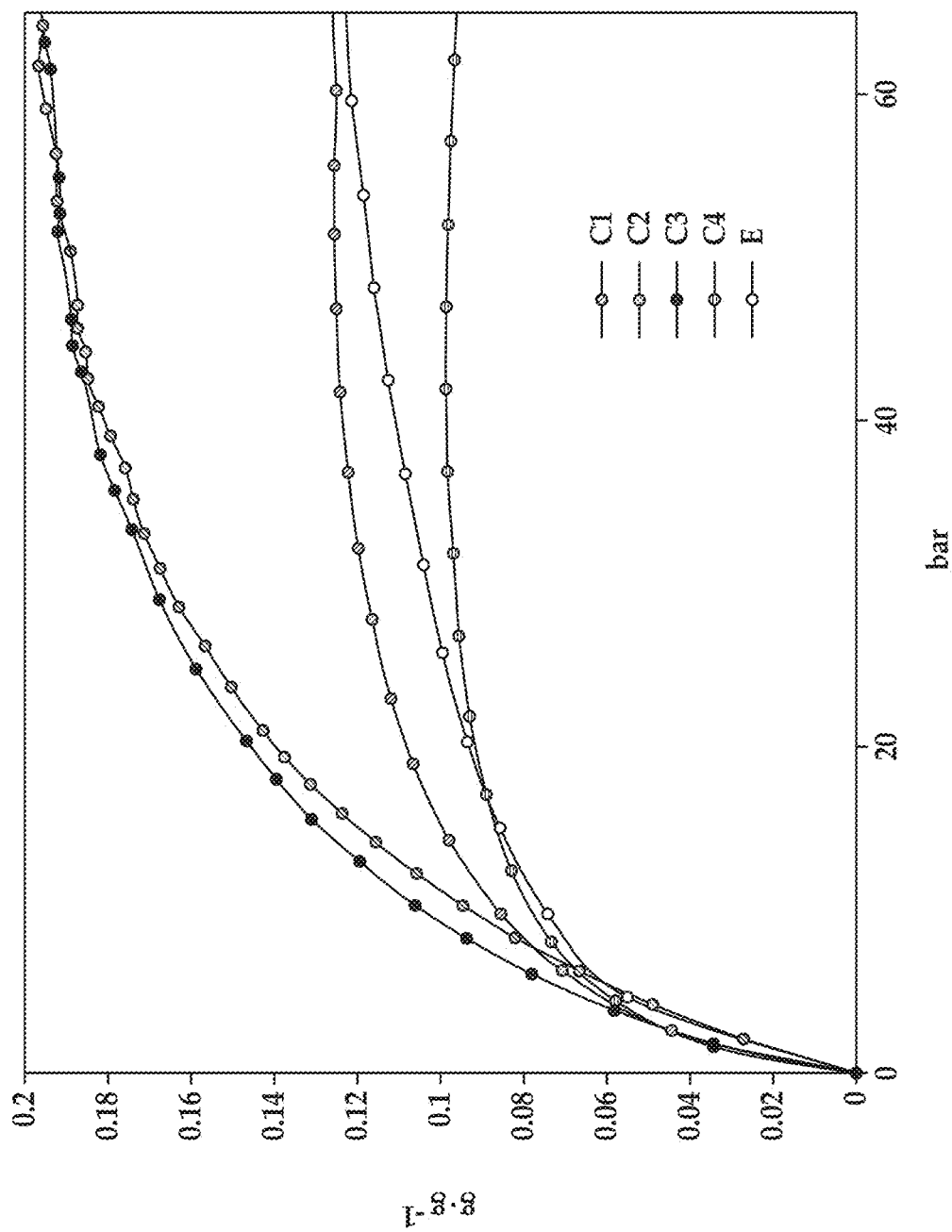
FIG. 8 is a graph depicting the excess methane adsorption (g·g$^{-1}$, Y axis) versus pressure (bar, X axis) for example carbon particles (E) with the hierarchical porous structure and comparative carbon particles (C1, C2, C3, C4).

The ability of carbon particles with the hierarchical porous structure formed in example 2 (E) to adsorb gas was measured. The ability of other comparative carbon particles, namely EnerG2 carbon (C1), MSC-30 (C2), Missouri (C3), and BrightBlack (C4), to adsorb gas was also measured. Methane was the gas used to make these measurements, and the results are shown in FIG. 8. FIG. 8 depicts the excess methane adsorption (g·g$^{-1}$, Y axis) versus pressure (bar, X axis) for the example carbon particles (E) and the comparative carbon particles (C1, C2, C3, C4). As shown in FIG. 8, the example carbon particles (E) show excess adsorption uptake in the same range as the comparative carbon particles (C1, C2, C3, C4).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 300° C. to less than 1500° C. should be interpreted to include not only the explicitly recited limits of from about 300° C. to less than 1500° C., but also to include individual values, such as 300° C., 370.75° C., 800° C., etc., and sub-ranges, such as from about 300° C. to about 900° C., from about 350° C. to about 1080° C., from about 700° C. to about 950° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A porous carbon material comprising:
    a microporous framework including a plurality of micropores, the plurality of micropores having a micropore size of less than 2 nm;
    a plurality of mesopores distributed throughout the microporous framework, the plurality of mesopores having a mesopore size of from 2 nm to 50 nm; and
    a plurality of macropores distributed throughout the microporous framework, the plurality of macropores having a macropore size of greater than 50 nm;
    wherein the porous carbon material has a micropore volume of greater than or equal to 2.766 cm$^3$/g and less than 3.974 cm$^3$/g, and
    wherein the porous carbon material is formed by:
        combining a halogenated-hydrocarbon, an aprotic hydrocarbon solvent, and a powder template to form a mixture;
        adding a reductant to the mixture to initiate a reaction that forms intermediate particles;
        removing the powder template from the intermediate particles; and
        subjecting the intermediate particles to a heat treatment at a heat treatment temperature ranging from about 300° C. to less than 1,500° C. for a heat treatment time period ranging from about 20 minutes to about 10 hours to form the porous carbon material,
        wherein the powder template enables formation of the mesopores and the macropores throughout the microporous framework.

2. An energy storage device including the porous carbon material of claim 1, wherein the energy storage device is one of an electric double-layer capacitor or a supercapacitor.

3. An energy storage device including the porous carbon material of claim 1, wherein the energy storage device is one of a lithium-sulfur battery or a lithium-selenium battery.

4. A gas storage system including the porous carbon material of claim 1, wherein the porous carbon material is capable of adsorbing at least one of methane, natural gas, carbon dioxide, butane, or hydrogen.

5. The porous carbon material of claim 1, wherein the aprotic hydrocarbon solvent is at least one of toluene, hexane, or cyclohexane.

6. The porous carbon material of claim 1, wherein the plurality of macropores have a macropore size of from 100 nm to 200 nm.

7. The porous carbon material of claim 1, wherein the plurality of mesopores and the plurality of macropores are randomly spaced within the porous carbon material.

8. The porous carbon material of claim 1, wherein at least some of the plurality of micropores are interconnected with one another, with at least some of the plurality of mesopores, and/or with at least some of the plurality of macropores.

9. The porous carbon material of claim 6, wherein the powder template is in the form of a first nanopowder including particles having a particle size of from 2 nm to 50 nm and a second nanopowder including particles having a particle size of from 100 nm to 200 nm.

10. The porous carbon material of claim 1, wherein the powder template is in the form of a nanopowder, and wherein the powder template comprises at least one of a silicon dioxide ($SiO_2$) nanopowder, a titanium dioxide ($TiO_2$) nanopowder, an aluminum oxide ($Al_2O_3$) nanopowder, or an iron (III) oxide ($Fe_2O_3$) nanopowder.

11. The porous carbon material of claim 1, wherein at least some of the plurality of micropores are interconnected with at least one of at least some of the plurality of mesopores and at least some of the plurality of macropores.

12. The porous carbon material of claim 1, wherein the porous carbon material has a surface area that is greater than or equal to 1032.06 m$^2$/g and less than 2,500 m$^2$/g as measured by the Brunauer, Emmett, and Teller (BET) test method.

13. The porous carbon material of claim 1, wherein the porous carbon material is in the form of porous carbon particles, and wherein each of the porous carbon particles has a particle size of from 1 μm to 500 μm.

14. The porous carbon material of claim 1, wherein the porous carbon material contains nitrogen, and wherein the nitrogen in the porous carbon material is an electrocatalyst for oxygen reduction.

15. An electrode including the porous carbon material of claim 1, a polymer binder, and a conductive filler.

16. The electrode of claim 15, wherein the porous carbon material constitutes, by weight, from about 50% to about 95% of the electrode, the conductive filler constitutes, by weight, from about 5% to 20% of the electrode, and the polymer binder constitutes, by weight, from about 5% to 20% of the electrode.

17. The electrode of claim 15, further including a composite that includes the porous carbon material and at least one of sulfur or selenium, and wherein the at least one of sulfur or selenium is loaded into the plurality of micropores, the plurality of mesopores, and/or the plurality of macropores of the porous carbon material.

18. The electrode of claim 17, wherein the porous carbon material constitutes, by weight, from about 25% to about 45% of the electrode, the at least one of sulfur or selenium constitutes, by weight, 25% to about 45% of the electrode, the conductive filler constitutes, by weight, from about 5% to 20% of the electrode, and the polymer binder constitutes, by weight, from about 5% to 20% of the electrode.

19. An energy storage device or a gas storage system including the porous carbon material of claim 1.

* * * * *